United States Patent
Weisz et al.

(10) Patent No.: US 11,189,264 B2
(45) Date of Patent: Nov. 30, 2021

(54) SPEECH RECOGNITION HYPOTHESIS GENERATION ACCORDING TO PREVIOUS OCCURRENCES OF HYPOTHESES TERMS AND/OR CONTEXTUAL DATA

(71) Applicant: Google LLC, Mountain View, CA (US)

(72) Inventors: Ágoston Weisz, Zurich (CH); Alexandru Dovlecel, Zurich (CH); Gleb Skobeltsyn, Kilchberg (CH); Evgeny Cherepanov, Adliswil (CH); Justas Klimavicius, Zurich (CH); Yihui Ma, Zurich (CH); Lukas Lopatovsky, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 126 days.

(21) Appl. No.: 16/614,241

(22) PCT Filed: Jul. 17, 2019

(86) PCT No.: PCT/US2019/042204
§ 371 (c)(1),
(2) Date: Nov. 15, 2019

(87) PCT Pub. No.: WO2021/006917
PCT Pub. Date: Jan. 14, 2021

(65) Prior Publication Data
US 2021/0012765 A1    Jan. 14, 2021

Related U.S. Application Data

(60) Provisional application No. 62/871,571, filed on Jul. 8, 2019.

(51) Int. Cl.
| | | |
|---|---|---|
| *G10L 15/07* | (2013.01) | |
| *G10L 15/183* | (2013.01) | |
| *G10L 15/08* | (2006.01) | |

(52) U.S. Cl.
CPC ............ *G10L 15/07* (2013.01); *G10L 15/083* (2013.01); *G10L 15/183* (2013.01)

(58) Field of Classification Search
CPC ..... G10L 17/24; G10L 13/07; G10L 15/1822; G10L 15/00; G10L 15/01; G10L 15/18;
(Continued)

(56) References Cited

U.S. PATENT DOCUMENTS 9,224,386 B1 * 12/2015 Weber ..................... G10L 15/08
9,558,740 B1 *  1/2017 Mairesse ................. G10L 15/08
(Continued)

FOREIGN PATENT DOCUMENTS

JP            5906615 B2 *    4/2016

OTHER PUBLICATIONS

English translation of JP-5906615-B2 (Year: 2016).*
(Continued)

*Primary Examiner* — Paras D Shah
(74) *Attorney, Agent, or Firm* — Middleton Reutlinger

(57) ABSTRACT

Implementations set forth herein relate to speech recognition techniques for handling variations in speech among users (e.g. due to different accents) and processing features of user context in order to expand a number of speech recognition hypotheses when interpreting a spoken utterance from a user. In order to adapt to an accent of the user, terms common to multiple speech recognition hypotheses can be filtered out in order to identify inconsistent terms apparent in a group of hypotheses. Mappings between inconsistent terms can be stored for subsequent users as term correspondence data. In this way, supplemental speech recognition hypotheses can be generated and subject to probability-based scoring for identifying a speech recognition hypothesis that most correlates to a spoken utterance provided by a user. In some implementations, prior to scoring, hypoth-
(Continued)

eses can be supplemented based on contextual data, such as on-screen content and/or application capabilities.

10 Claims, 6 Drawing Sheets

(58) Field of Classification Search
CPC ....... G10L 15/1815; G10L 15/22; A63H 3/28; A63H 2200/00; A63H 3/02
See application file for complete search history.

(56) References Cited

U.S. PATENT DOCUMENTS

| | | |
|---|---|---|
| 9,576,578 B1 * | 2/2017 | Skobeltsyn ............. G10L 15/22 |
| 10,176,802 B1 * | 1/2019 | Ladhak ................... G10L 15/16 |
| 2002/0184019 A1 | 12/2002 | Hartley et al. |
| 2004/0186714 A1 | 9/2004 | Baker |
| 2017/0229124 A1 * | 8/2017 | Strohman ............... G10L 15/19 |
| 2018/0096678 A1 * | 4/2018 | Zhou ....................... G10L 15/32 |
| 2021/0064822 A1 * | 3/2021 | Velikovich ............ G06F 40/295 |

OTHER PUBLICATIONS

European Patent Office; International Search Report and Written Opinion of Ser. No. PCT/US2019/042204; 16 pages; dated Jan. 29, 2020.

* cited by examiner

SPEECH RECOGNITION HYPOTHESIS GENERATION ACCORDING TO PREVIOUS OCCURRENCES OF HYPOTHESES TERMS AND/OR CONTEXTUAL DATA

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

In some instances, an automated assistant may be accessible to a variety of users having variations in their respective accents, thereby creating accuracy issues with respect to speech recognition. For instance, certain accents can cause a speech recognition process to consistently misrecognize certain words, phrases, and/or phonemes. As a result, users with such accents may have to repeatedly provide spoken utterances until the speech recognition process generates an accurate response to the users. Although certain speech recognition processes may attempt to adapt to certain accents, such processes may only learn from errors that have been explicitly identified by a user. This can result in delays in resolving certain speech recognition issues, and may waste computational resources. For instance, processing spoken utterances directed at an automated assistant in furtherance of correcting recognition mistakes of the automated assistant can be burdensome on portable electronic devices with limited resources.

SUMMARY

Implementations set forth herein relate to speech recognition processes for supplementing a variety of speech recognition hypotheses, in view of differences in accents and/or other speech differences between users, in order to reduce occurrences of misrecognition of speech content. Speech differences (such as but not limited to accents and speech impediments) can exist across a user base, even between users that are located in a similar geographic area. By reducing occurrences of misrecognition, the disclosed technology may provide a more effective speech recognition process. Being able to accurately process speech of a variety of different accents can reduce instances of spoken utterances being misrecognized, users needing to repeat misrecognized spoken utterances, and/or computing devices initializing actions that were not intended by spoken utterances. Each of these accidental occurrences can waste computational resources. However, implementations discussed herein can mitigate such occurrences, thereby preserving essential computational resources such as battery life, processing bandwidth, and/or network bandwidth.

Initially, in order to adapt speech recognition capabilities of a device to variations in accents and/or other speech differences, audio data corresponding to a spoken utterance provided by user can be processed in order to generate multiple different speech recognition hypotheses. Each speech recognition hypothesis of the multiple different speech recognition hypotheses can include natural language content that is estimated to correspond to the original natural language content of the spoken utterance provided by the user. For example, a user with an Irish accent can provide a spoken utterance to a computing device in order to identify an object that is within a field of view of a camera of the computing device. The object can be, for instance, a statue located in a downtown area of a city, and in order to identify the object, the user can provide a spoken utterance, such as "Assistant, what is the object to the right of the camera?" Audio data characterizing the spoken utterance can be processed in order to generate a plurality of speech recognition hypotheses. The speech recognition hypotheses generated in response can include phrases, such as "Assistant, what is the object to Detroit of the camera," and, "Assistant, what is the object to the right of the camera."

In order to adapt the speech recognition process according to the accent and/or other speech differences of the user, one or more matching natural language terms can be identified in a set of speech recognition hypotheses. Furthermore, two or more inconsistent natural language terms within the set of speech recognition hypotheses can also be identified. In some implementations, the two or more inconsistent natural language terms can be identified according to whether the two or more inconsistent natural language terms share a common position within their respective speech recognition hypotheses. For example, the term "object to" and the term "of the camera" are matching terms relative to the two speech recognition hypotheses provided above. Furthermore, the term "Detroit" and "the right" are inconsistent between the two speech recognition hypotheses. Moreover, these two inconsistent terms share a common position between the natural language terms, "object to" and "of the camera," provided in each speech recognition hypothesis, where the term "object to" is considered a matching term because the term is present in two speech recognition hypotheses, and the term "of the camera" is also considered a matching term because the term is present in two speech recognition hypotheses.

The multiple speech recognition hypotheses can be prioritized and/or ranked in order to identify a particular speech recognition hypothesis, of the multiple speech recognition hypotheses, that is estimated to most correspond to, or to most accurately reflect, the original natural language content of the spoken utterance from the user. For instance, the speech recognition hypothesis, "Assistant, what is the object to the right of the camera" can be selected, for instance, based on a frequency of occurrence of all of, and/or portions of, the prioritized speech recognition hypothesis being greater than the other speech recognition hypotheses, and/or based on an output of a natural language model. In order to further adapt this speech recognition process to the accent of the user (e.g., the accent that resulted in the phrase "the right" being interpreted as "Detroit"), features of (e.g. correspondences and/or inconsistencies between) the plurality of spoken utterance hypotheses can be used in order to improve accuracy of subsequent speech recognition processes.

In some implementations, term correspondence data can be generated to characterize a relationship between two or more inconsistent natural language terms that were identified during processing of a spoken utterance from a user. For instance, the term correspondence data can identify "Detroit" and "the right" as corresponding terms with a candidate term "the right" being the misrecognized term of the original spoken utterance, and a related term "Detroit" being a corresponding predicted term. In some implementations, the term correspondence data can also identify relative position of the related term(s) and/or candidate term(s) within one or more speech recognition hypotheses. For example, the term "to" and/or the term "of" can be identified by the term correspondence data, and the term correspondence data can provide a position indicator that characterizes previous recognized terms as being located between the two terms, "to" and "of" In some implementations, the term correspondence data can have a format such as, "term[ ]=term_1("Detroit"; "the right"; position[1, 0, 1]="to", "term_1", "of")," thereby indicating that the two corresponding terms are "Detroit" and "the right" and, optionally, that the related term "Detroit" is found between terms "to" and "of."

Subsequent to the term correspondence data being generated, the user can provide, at some later time, another spoken utterance that is processed according to the speech recognition techniques discussed herein. Audio data corresponding to the subsequent spoken utterance can be processed in order to generate multiple different speech recognition hypotheses. The speech recognition hypotheses can be analyzed to determine whether any candidate term, identified in the term correspondence data, is included in one or more speech recognition hypotheses. Furthermore, the speech recognition hypotheses can be analyzed to determine whether a corresponding related term, which can be a previously predicted term that corresponds to a candidate term of a previous hypothesis, is also identified in the multiple speech recognition hypotheses.

As an example, the subsequent spoken utterance from the user can be, "Assistant, navigate to Detroit from my current location." Audio data corresponding to the subsequent spoken utterance can be processed in order to generate a plurality of speech recognition hypotheses. These speech recognition hypotheses can include, "Assistant, navigate to the right of my car's location," "Assistant, navigate to the right from my current location," and "Assistant, navigate to the right for my current vacation."

When a determination is made that a candidate term (e.g., "the right") that is included in term correspondence data is identified in one or more speech recognition hypotheses, a determination can be made as to whether a corresponding related term (e.g., "Detroit") is identified in any speech recognition hypothesis of the multiple speech recognition hypotheses. When the corresponding related term (e.g., "Detroit"), provided in the term correspondence data, is not identified in the multiple speech recognition hypotheses but the candidate term (e.g., "the right") is, one or more supplemental speech recognition hypotheses can be generated (e.g., "Assistant, navigate to Detroit from my current location."). A supplemental speech recognition hypothesis can include other terms from the speech recognition hypothesis that have already been generated, as well as the related term (e.g., "Detroit") that has a relationship in the term correspondence data with the candidate term (e.g., "the right"). In this way, the supplemental speech recognition hypotheses can be further processed with the initially-generated speech recognition hypotheses in order to identify a particular speech recognition hypothesis that should be prioritized over the other speech recognition hypotheses (i.e., selected as the correct/most likely to be correct recognition result). A highest prioritized speech recognition hypothesis can then be used for rendering further content and/or initializing an action in response to the subsequent spoken utterance from the user. In some implementations, a supplemental speech recognition hypothesis can be generated by using an existing speech recognition hypothesis and replacing a term from the existing speech recognition hypothesis with a corresponding term from the term correspondence data.

In some implementations, one or more supplemental speech recognition hypotheses can be generated based on one or more initial speech recognition hypotheses having terms that are positioned relative to a candidate term identified in the term correspondence data. For example, a related term can be incorporated into a supplemental speech recognition hypothesis based on a candidate term being located between two particular terms within a speech recognition hypothesis. Alternatively, or additionally, a related term can be incorporated into a supplemental speech recognition hypothesis based on a candidate term being located adjacent to a first particular term within a first initial speech recognition hypothesis and the candidate term also being located adjacent to a second particular term within a second initial speech recognition hypothesis. For example, referring to the aforementioned example, a supplemental speech recognition hypothesis can be generated to include the related term "Detroit" based on an initial speech recognition hypothesis including the term "to" adjacent to the candidate term "the right," and another speech recognition hypothesis including the term "of" adjacent to the candidate term "the right." These conditions can satisfy position data set forth in the term correspondence data for generating supplemental speech recognition hypotheses when interpreting a given spoken utterance.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
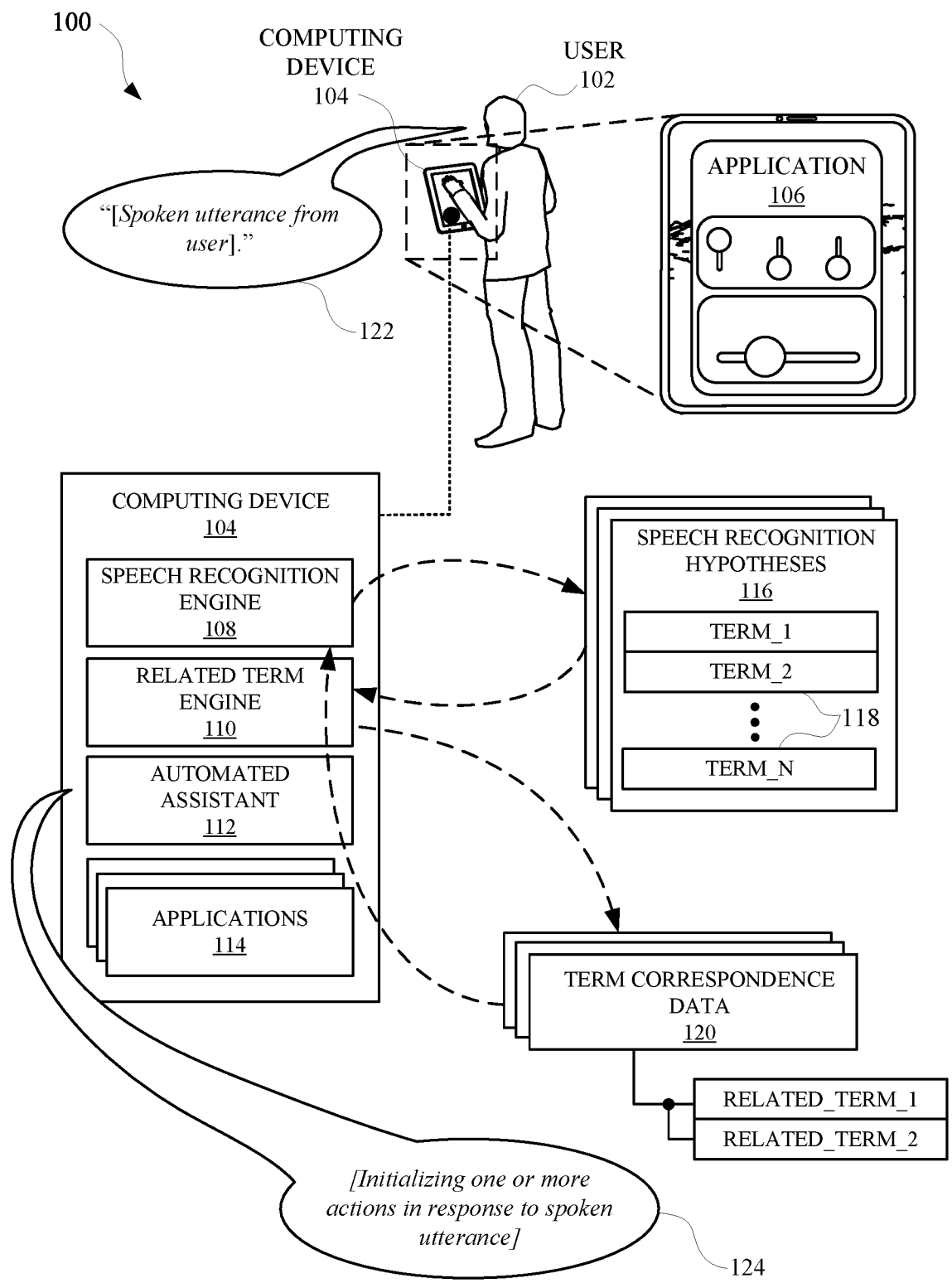
FIG. 1 illustrates a view of a speech recognition process for generating term correspondence data from various speech recognition hypotheses in order to supplement sets of speech recognition hypotheses in response to subsequent spoken utterances.

FIG. 1 illustrates a view 100 of a speech recognition process for generating term correspondence data 120 from various speech recognition hypotheses 116 in order to supplement sets of speech recognition hypotheses in response to subsequent spoken utterances. Specifically, a user 102 can be operating a computing device 104 and provide a spoken utterance 122 in order to control an automated assistant 112 that is accessible via the computing device 104. The spoken utterance 122 can be received at an audio interface of the computing device 104 in order to generate audio data from the spoken utterance 122. The audio data can be processed by a speech recognition engine 108 of the computing device 104, which can generate one or more speech recognition hypotheses 116 in furtherance of characterizing the spoken utterance 122. Each speech recognition hypothesis 116 can include one or more terms 118, which can be words, phrases, letters, and/or phonemes that are estimated, by the speech recognition engine 108, to characterize one or more portions of the spoken utterance 122 from the user 102.

One or more speech recognition hypotheses 116 and/or terms 118 can be processed by a related term engine 110 of the computing device 104. The related term engine 110 can identify terms that are common to two or more speech recognition hypotheses and, in some implementations, generate a count for each term that is incorporated into two or more speech recognition hypotheses 116. A count for a term 118 can indicate a strength of correlation between that term 118 and another term 118 that is determined to have a lower count. A particular term 118 can be subject to counting or other tracking when the particular term 118 is a less common term relative to other parts of speech, such as prepositions, pronouns, and conjunctions. For example, for each speech recognition hypothesis 116, the more common parts of speech (e.g., prepositions, pronouns, and conjunctions) can be bypassed in order to identify terms 118 for use when generating term correspondence data 120. For example, when considering terms 118 that are remaining after common parts of speech are eliminated (e.g., eliminated after a distribution and/or frequency one or more common parts of speech reaches or exceeds a threshold corresponding to the user and/or a population of users), a TERM_1 may appear X number of times and a TERM_2 may appear Y number of times in the speech recognition hypotheses.

The related term engine 110 can determine these counts (X and Y, where X and Y are any number(s)) and generate term correspondence data 120 that characterizes a relationship between TERM_1 and TERM_2. For example, the term correspondence data 120 that is generated by the related term engine 110 can include relationship data that characterizes TERM_1 as a "RELATED_TERM_1" and TERM_2 as a "RELATED_TERM_2." Furthermore, the term correspondence data 120 can characterize these two terms as having previously been included in one or more sets of speech recognition hypotheses 116 in response to one or more corresponding spoken utterances from the user 102 and/or one or more other users. In this way, when a subsequent spoken utterance is provided by the user 102, and a set of speech recognition hypotheses are generated as including RELATED_TERM_2 but not RELATED_TERM_1, the computing device 104 can use the term correspondence data 120 in order to generate one or more supplemental speech recognition hypotheses 116 that include the RELATED_TERM_1. This can expand a scope of speech recognition hypotheses that will be considered when identifying an appropriate response for the automated assistant 112 to provide to the user 102.

During the process of generating the term correspondence data 120, the automated assistant 112 can nonetheless respond to the user 102 with an output 124, which can include initializing one or more actions via the computing device 104. The response from the automated assistant 112 may or may not depend on the term correspondence data 120, considering TERM_1 and TERM_2 were both present in the speech recognition hypotheses 116. However, if a particular related term is identified in at least one speech recognition hypothesis, and another term identified in the term correspondence data 120 is not identified in at least one speech recognition hypothesis, the computing device 104 can generate one or more supplemental speech recognition hypotheses based on the other term identified in the term correspondence data 120.

In some implementations, the term correspondence data 120 can provide other data that characterizes the context in which TERM_1 and TERM_2 were both identified as related terms. For example, in some implementations, the term correspondence data 120 can be generated to include position data that characterizes a position of TERM_1 relative to one or more other terms in a speech recognition hypothesis 116 in which TERM_1 was identified. For instance, TERM_1 and TERM_2 can be identified by the term correspondence data 120 as being located directly adjacent to, or otherwise included in a speech recognition hypothesis 116, with a separate term, which can be explicitly identified by the term correspondence data 120. Alternatively, or additionally, TERM_1 and TERM_2 can be identified by the term correspondence data 120 as being associated with an application 106 that the user 102 was accessing when the user 102 provided a spoken utterance 122 that resulted in TERM_1 being initially included in a speech recognition hypothesis 116 generated by the speech recognition engine 108. Alternatively, or additionally, TERM_1 and TERM_2 can be identified by the term correspondence data 120 as being associated with a website, a location, a time, one or more other users, and/or any other contextual data, and/or combination thereof, when the user 102 provided a spoken utterance 122 that resulted in TERM_1 being initially included in a speech recognition hypothesis 116 generated by the speech recognition engine 108.

Figure 2:
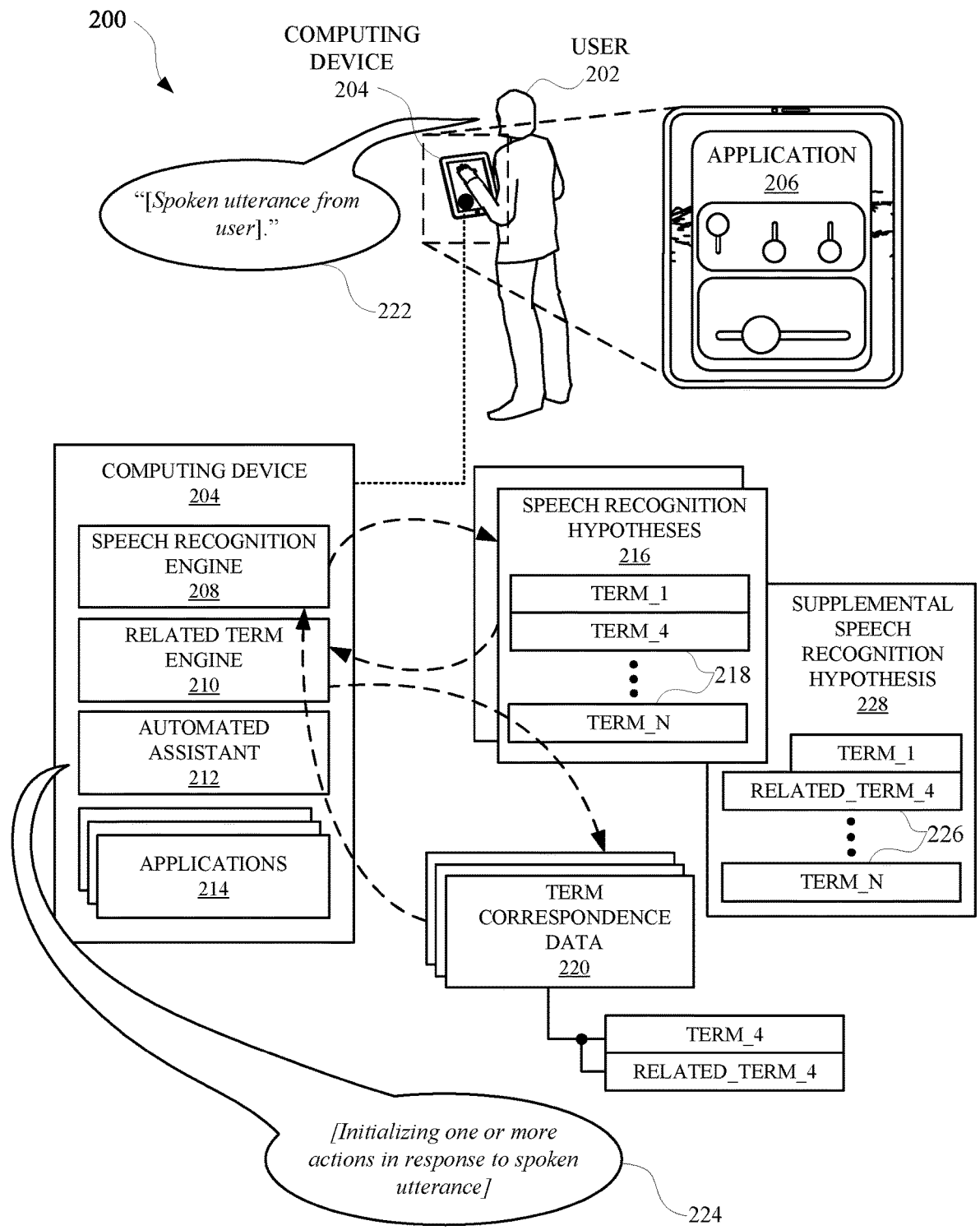
FIG. 2 illustrates a view of a user providing a spoken utterance and causing one or more supplemental speech recognition hypotheses to be generated based on term correspondence data.

FIG. 2 illustrates a view 200 of a user 202 providing a spoken utterance 222 and causing one or more supplemental speech recognition hypotheses 228 to be generated based on term correspondence data 220. The user 202 can provide the spoken utterance 222 subsequent to term correspondence data 220 being generated for characterizing a relationship between two or more terms (e.g., RELATE_TERM_1 and RELATE_TERM_2), such as in the scenario described with respect to FIG. 1. In response to receiving the spoken utterance 222, a speech recognition engine 208 of a computing device 204 can generate one or more speech recognition hypotheses 216. Each speech recognition hypothesis 216 can include one or more terms, which can be a word, phrase, letter, and/or phoneme that can be used to compile a hypothesis with the intention of characterizing natural language content of the spoken utterance.

A related term engine 210 can process the speech recognition hypotheses 216 in order to determine whether terms 218 in the speech recognition hypotheses 216 correspond to terms identified in the term correspondence data 220. When a term 218 (e.g., "TERM_4) is identified in the term correspondence data 220 as having a related term (e.g., "RELATE_TERM_4"), the related term engine 210 can communicate the term and the related term to the speech recognition engine 208. For example, TERM_4 can be determined to have a corresponding related term, RELATE_TERM_4, which can be identified by the related term engine 210 and provided to the speech recognition engine 208. The speech recognition engine 208 can use the related term to generated a supplemental speech recognition hypothesis 228, which can include one or more of the terms of an existing speech recognition hypothesis 216, but can replace one or more other terms of the existing speech recognition hypothesis 216 with one or more "related" terms identified from the term correspondence data 220. For instance, TERM_1 and TERM_N can be included in a speech recognition hypothesis 216 and a supplemental speech recognition hypothesis 228—however, TERM_4 from the speech recognition hypothesis 216 can be replaced with RELATED_TERM_4 226 from the term correspondence data 220.

In some implementations, the supplemental speech recognition hypothesis 228 can be generated based on whether the user 202 provided the spoken utterance 222 within a context that corresponds to contextual data provided in the term correspondence data 220. For instance, if the contextual data indicates that the RELATED_TERM_4 226 is related to TERM_4 when the user is accessing application 206, the RELATED_TERM_4 226 can be incorporated into a supplemental speech recognition hypothesis 228 when: (i) TERM_4 is provided in a speech recognition hypothesis 216 and (ii) the speech recognition hypothesis 216 is generated in response to a spoken utterance 222 that was provided by the user 202 while the user 202 was accessing the application 206. Alternatively, or additionally, the supplemental speech recognition hypothesis 228 can be generated based on the related term engine 210 determining that the TERM_4 218 is positioned within a speech recognition hypothesis 216 in accordance with position data included in the term correspondence data 220. For example, the position data can indicate that, when the TERM_4 is positioned at a particular position relative to one or more other terms (e.g., positioned between two particular terms, positioned directly between two particular terms, positioned to the right or left of a particular term, positioned directly to the right or directly to the left of a particular term(s), and/or any other position for a term) within a speech recognition hypothesis 216, the TERM_4 can be related to a RELATED_TERM_4 identified in the term correspondence data 220.

When the speech recognition hypotheses and/or one or more supplemental speech recognition hypotheses have been generated, the computing device 204 and/or a server device can rank the hypotheses in order to identify a particular speech recognition hypothesis that is prioritized over other hypotheses. The most prioritized speech recognition hypothesis can be one that is determined to most correlate to the spoken utterance 222 and/or the context in which the user 202 provided the spoken utterance 222. The automated assistant 212 can then provide an output 224 based on the most prioritized speech recognition hypothesis by initializing one or more actions in accordance with the spoken utterance 222. The degree of priority of each speech recognition hypothesis can be determined based on predicted accuracy of the speech recognition hypothesis relative to the spoken utterance and/or audio data, relevance of each speech recognition hypothesis to a context of the user, historical data characterizing previous interactions between the user and one or more applications, application data, device data, and/or any other information that can be used to prioritize a particular speech recognition hypothesis.

Figure 3:
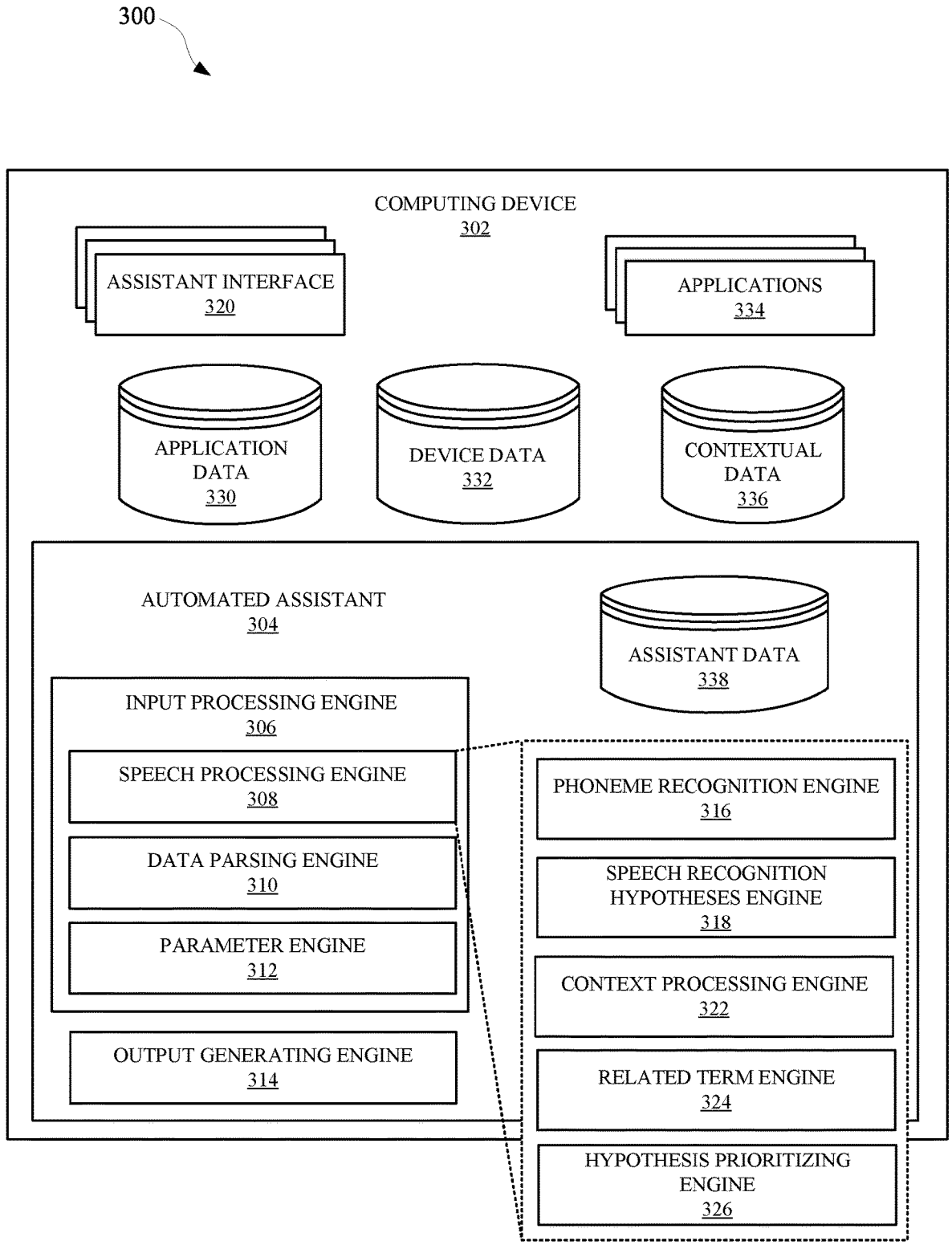
FIG. 3 illustrates a system for supplementing a variety of speech recognition hypotheses, in view of differences in accents and/or other speech differences between users, in order to reduce occurrences of misrecognition of speech content.

FIG. 3 illustrates a system 300 for supplementing a variety of speech recognition hypotheses, in view of differences in accents and/or other speech differences between users, in order to reduce occurrences of misrecognition of speech content. The system 300 can optionally include an automated assistant 304, which can operate as part of an assistant application that is provided at one or more computing devices, such as a computing device 302. A user can interact with the automated assistant 304 via an assistant interface 320, which can be a microphone, a camera, a touch screen display, a user interface, and/or any other apparatus capable of providing an interface between a user and an application. For instance, a user can initialize the automated assistant 304 by providing a verbal, textual, or a graphical input to the assistant interface to cause the automated assistant 304 to perform a function (e.g., provide data, control a peripheral device, access an agent, generate an input and/or an output, etc.). The computing device 302 can include a display device, which can be a display panel that includes a touch interface for receiving touch inputs and/or gestures for allowing a user to control applications of the computing device 302 via the touch interface. In some implementations, computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other computing devices can be in communication with a server device over a network, such as the internet. Additionally, the computing device 302 and the other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and computing device 302 can transmit inputs received at one or more assistant interfaces 320 to a server device. However, in some implementations, the automated assistant 304 can be hosted at the computing device 302 as a client automated assistant.

In various implementations, all or less than all aspects of the automated assistant 304 can be implemented on the computing device 302. In some of those implementations, aspects of the automated assistant 304 are implemented via a client automated assistant of the computing device 302 and interface with the server device that implements other aspects of the automated assistant 304. The server device can optionally serve a plurality of users and their associated assistant applications via multiple threads. In implementations where all or less than all aspects of the automated assistant 304 are implemented via a client automated assistant at the computing device 302, the client automated assistant can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 and/or the client automated assistant can include an input processing engine 306, which can employ multiple different engines for processing inputs and/or outputs for the computing device 302 and/or the server device. For instance, the input processing engine 306 can include a speech processing engine 308 that can process audio data received at an assistant interface 320 to identify the text embodied in the audio data and/or generate speech recognition hypotheses according to implementations discussed herein. In some implementations, the audio data can be transmitted from, for example, the computing device 302 to the server device for further processing in order to preserve computational resources at the computing device 302.

The process for converting the audio data to text can include a speech recognition algorithm, which can employ neural networks, and/or statistical models for identifying groups of audio data corresponding to phonemes, words, and/or phrases. The text converted from the audio data can be parsed by a data parsing engine 310 and made available to the automated assistant 304 as textual data that can be used to generate and/or identify command phrases from the user. In some implementations, output data provided by the data parsing engine 310 can be provided to a parameter engine 312 to determine whether the user provided an input that corresponds to a particular action and/or routine capable of being performed by the automated assistant 304 and/or an application or agent that is capable of being accessed by the automated assistant 304. For example, assistant data 338 can be stored at the server device and/or the computing device 302, as device data 332, and can include data that defines one or more actions capable of being performed by the automated assistant 304 and/or client automated assistant, as well as parameters necessary to perform the actions.

In some implementations, the speech processing engine 308 can operate one or more engines for generating and/or processing speech recognition hypotheses. For example, the speech processing engine 308 can include a phoneme recognition engine 316, which can process audio data in order to identify one or more phonemes, words, and/or phrases being characterized by the audio data. For example, the user can provide a spoken utterance, such as "Assistant, add bacon to my shopping list." In response, audio data corresponding to the spoken utterance can be processed in order to identify particular phonemes within the audio data. Each phoneme, and/or a combination of phonemes, can be assigned a score, which can characterize a probability that the particular phoneme and/or combination of phonemes accurately characterizes to a particular portion of audio data. For example, a first set of phonemes corresponding to the portion of audio data that captured the user saying the word "bacon," can include "b," "ee," "ca," and "n," and a second set of phonemes can include "b," "a," "er," "ca," and "n."

In some implementations, one or more phonemes and/or sets of phonemes can be assigned a score that is based on speech recognition data characterizing speech patterns of the user and/or one or more other users. Alternatively, or additionally, the one or more phonemes and/or sets of phonemes can be assigned a score that is based on contextual data 336, which can be processed by a context processing engine 322. The context processing engine 322 can process contextual data 336 in order to determine a likelihood that a phoneme and/or a combination of phonemes would be provided by the user. The contextual data 336 can characterize data being rendered by one or more applications of the computing device 302 and/or another computing device associated with the user. For instance, when the user is accessing an application 334, such as a recipe application, and the application 334 is rendering words or phrases at a graphical user interface of the computing device 302, these words or phrases can be processed by the context processing engine 322 in order to assign scores to sets of phonemes based on the context in which the user provided the spoken utterance. When the contextual data characterizes a word that was provided by the user in the spoken utterance, phonemes, which can be combined to pronounce the word, can be prioritized over other phonemes that cannot be combined to pronounce the word when the combination is rendered audibly.

Based on the phonemes and/or the combination of phonemes generated based on the audio data, a speech recognition hypothesis engine 318 can generate one or more speech recognition hypotheses. For example, a first speech recognition hypothesis can include, "Assistant, add beer can to my shopping list," and a second speech recognition hypothesis can include, "Assistant, add bacon to my shopping list." In some implementations, a hypothesis prioritizing engine 326 can prioritize one speech recognition hypothesis over other speech recognition hypotheses. Priority of a speech recognition hypothesis can be based on predicted accuracy of the speech recognition hypothesis relative to the spoken utterance and/or audio data, relevance of each speech recognition hypothesis to a context of the user, historical data characterizing previous interactions between the user and one or more applications 334, application data 330, device data 332, and/or any other information that can be used to prioritize a particular speech recognition hypothesis.

In some implementations, the speech processing engine 308 can include a related term engine 324. The related term engine 324 can identify one or more terms within one or more speech recognition hypothesis that are related to other terms and other speech recognition hypotheses. For example, and in accordance with the previous scenario, the related term engine 324 can determine that the first speech recognition hypotheses and the second speech recognition hypothesis are identical except for the term "beer can" and the term "bacon." Based on this determination, the related term engine 324 can generate term correspondence data characterizing a relationship between the term "beer can" and the term "bacon." Alternatively, or additionally, the related term engine 324 can determine that the first speech recognition hypothesis and a second speech recognition hypothesis are identical except for certain phonemes. For example, a phoneme term "ee" from the first speech recognition hypothesis is different from the phone in terms "a" and "er" from the second speech recognition hypothesis. Based on the related term engine 324 identifying differences between these phonemes, the related term engine 324 can generate term correspondence data characterizing a relationship between the phoneme term "ee" and the phoneme terms "a" and "er."

In some implementations, the speech recognition hypotheses engine 318 can use the term correspondence data in order to modify and/or supplement speech recognition hypotheses. For example, should the user provide the same spoken utterance, "Assistant, add bacon to my shopping list," and the speech recognition hypothesis engine 318 generate hypotheses that do not include the term bacon, but rather include the term beer can and/or the phoneme term "ee," the speech recognition hypothesis engine 318 can generate one or more supplemental speech recognition hypotheses. Specifically, the speech recognition hypotheses engine 318 can generate at least one speech recognition hypothesis that includes the term "bacon" and/or phoneme term "ee," at least based on the term correspondence data providing a relationship between the term "beer can" and/or "ee" and the term bacon and/or "a" and "er." In some implementations, the term correspondence data can identify relative position of a related term in order that the speech recognition hypothesis engine 318 can generate supplemental speech recognition hypotheses according to relationships between terms and relative position of related terms within certain speech recognition hypotheses. As an example, the position data of the term correspondence data can indicate that a term (e.g., a phoneme "ee") is related to another term (e.g., a phoneme "a" and/or "er") when the term is directly adjacent to an existing term (e.g., "b" and/or "ca")

When one or more supplemental speech recognition hypotheses have been generated, the already generated speech recognition hypotheses—as well as the supplemental speech recognition hypotheses, can be prioritized via the hypothesis prioritizing engine 326. In some implementations, a speech recognition hypothesis that is prioritized over all others can be the speech recognition hypothesis that is determined to be a most accurate rendering of the spoken utterance provided by the user. This determination can be based on contextual data 336, such as a location of the user, historical interactions between the user and the computing device 302 and/or an automated assistant 304, data that is accessible via the computing device 302, data that has been rendered via one or more interfaces of the computing device 302 (e.g., a recipe that includes bacon), images rendered at a graphical user interface that is in communication with the computing device and processed by an image recognition engine (e.g., one or more images of bacon) and/or another device that is in communication with the computing device 302, and/or any other information that can be relevant to ranking or scoring speech recognition hypotheses. An output generating engine 314 can initialize one or more actions based on the speech recognition hypothesis that is prioritized over all other speech recognition hypotheses. For example, when the speech recognition hypothesis, "Assistant, add bacon to my shopping list," is the highest prioritized speech recognition hypothesis, the automated assistant 304 can initialize a shopping application and cause the shopping application to edit a shopping list document to include "bacon."

Figure 4A:
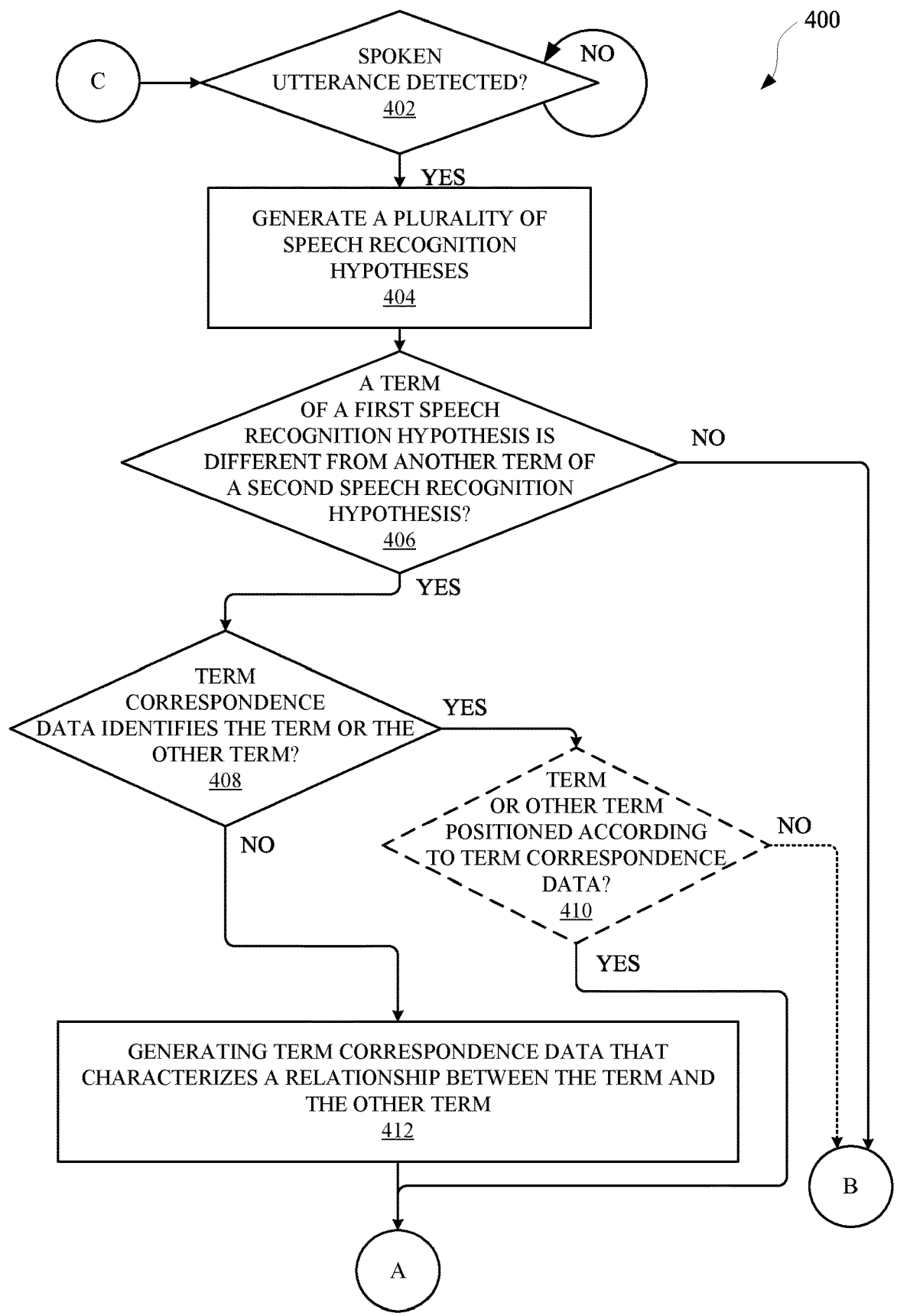
FIG. 4A and FIG. 4B illustrate methods for generating and/or using term correspondence data for creating a variety of different speech recognition hypotheses for reducing frequency of misrecognition of spoken inputs.
Figure 4B:
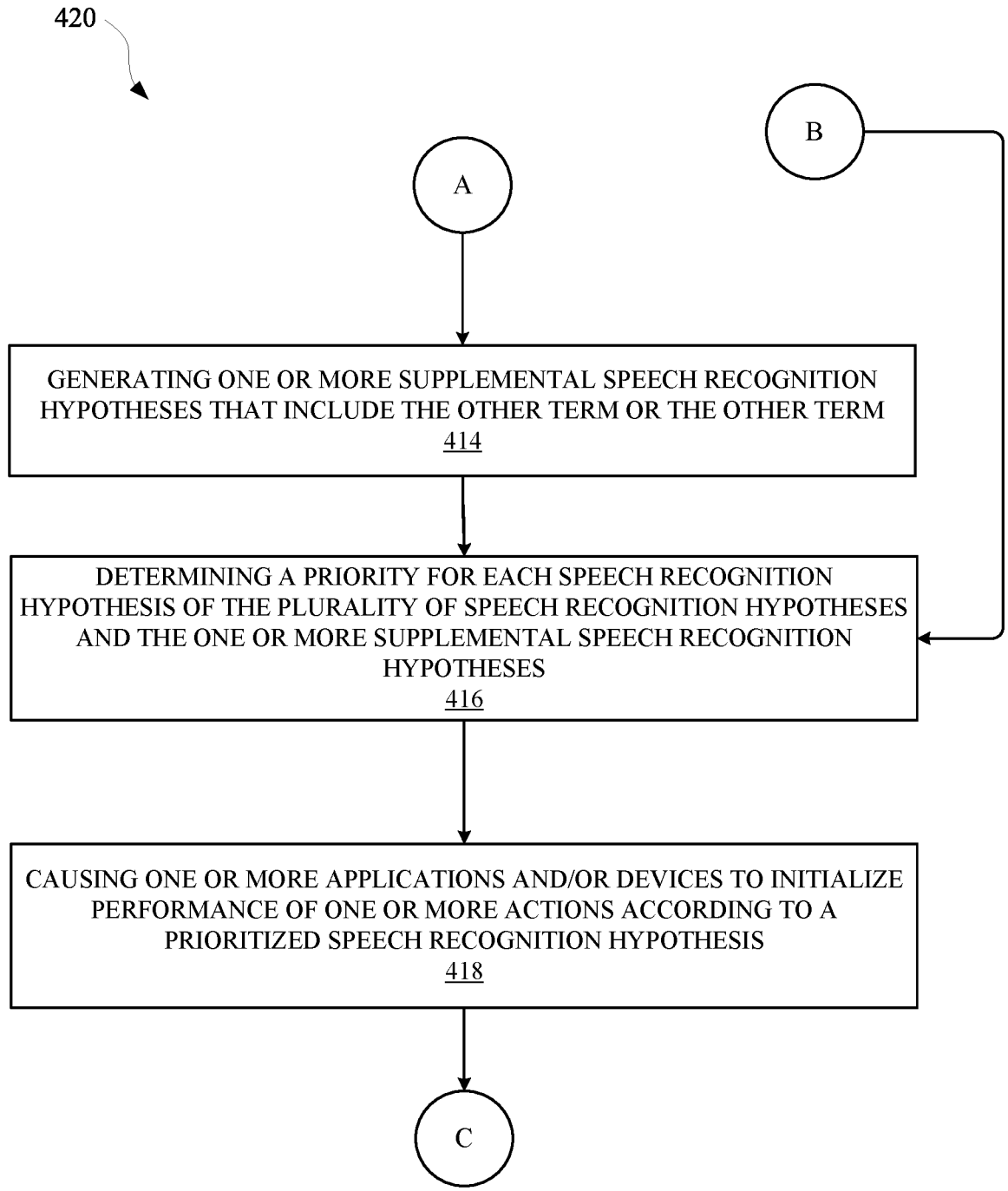

FIG. 4A and FIG. 4B illustrate a method 400 and a method 420, respectively, for generating and/or using term correspondence data for creating a variety of different speech recognition hypotheses for reducing frequency of misrecognition of spoken inputs. The method 400 and the method 420 can be performed by one or more computing devices, applications, and/or any other apparatus or engine capable of being responsive to a spoken input from a user. The method 400 can include an operation 402 of determining whether a spoken utterance was provided by a user. The determination can be performed at a computing device that is controlled by a user and that includes an audio interface, such as one or more microphones and/or one or more speakers. In some implementations, the computing device can provide access to an automated assistant, which can be responsive to spoken utterances from one or more users and can control one or more applications and/or devices in response to spoken utterances from the one or more users. When a spoken utterance is detected, the method 400 can proceed to an operation 404. However, when a spoken utterance is not detected, audio data generated based on inputs to the audio interface can be further processed to determine whether a spoken utterance is directed to the computing device by one or more users.

The operation 404 can include generating a plurality of speech recognition hypotheses in furtherance of determining natural language content of the spoken utterance from the user. The speech recognition hypotheses can be generated by processing audio data that characterizes the spoken utterance. The audio data can be separated into segments, which can be individually analyzed to identify one or more phonemes that, when spoken by the user, create audible sound waves that resemble a corresponding audio data segment. In some implementations, each phoneme and/or group of phonemes for a particular audio segment can be scored according to their respective similarity to the corresponding audio data segment. Based on the scoring, series of phonemes can be selected for each hypothesis, and the phonemes can be converted into characters, words, and/or phrases, thereby creating the natural language content for each hypothesis.

The method 400 can proceed from the operation 404 to an operation 406, which can include determining whether a term of a first speech recognition hypothesis is different from another term of a second speech recognition hypothesis. As an example, the user can provide a spoken utterance to the computing device in order to direct a computing device to perform an action, such as controlling lights in the home of the user. In this instance, the spoken utterance can be, "Assistant, turn down the lights in the living room." Speech recognition hypotheses generated based on the spoken utterance can include, "Assistant, turn in the lights in the living room," and "Assistant, turn on the lights in the living room." In accordance with the operation 406, the term and/or phoneme "on" can be identified as a term in a speech recognition hypothesis that is different from another term and/or phoneme "in" identified in the other speech recognition hypothesis. However, when the speech recognition hypotheses do not include variations in terms, the method 400 can proceed from the operation 406, via continuation element "B," to an operation 416 at the method 420.

When a determination is made that the speech recognition hypotheses include a term that is different from another term, the method 400 can proceed from the operation 406 to an operation 408. The operation 408 can include determining whether term correspondence data identifies the term (e.g., "in") or the other term (e.g., "on"). The term correspondence data can include data that characterizes multiple different terms, as well as a relationship between multiple different terms, at least for purposes of generating supplemental speech recognition hypotheses. The term correspondence data can be generated over time as a user interacts with their respective computing devices. In this way, as the user continues to interact with their devices, a lexicon of hypotheses can be expanded for each subsequently provided spoken utterance.

When the term correspondence data does not identify the term or the other term, the method 400 can proceed from the operation 408 to an operation 412. The operation 412 can include generating term correspondence data that characterizes a relationship between (i) the term and a related term, and/or (ii) the other term and another related term. For example, with respect to the aforementioned scenario, the term "in" can be characterized by the term correspondence data as having a relationship with a related term, such as "down." In some implementations, other content of the hypotheses can also be identified by the term correspondence data and/or used to indicate the relationship between the two terms. For example, one or more words (e.g., "turn") adjacent to each term can be identified by the term correspondence data. In this way, when subsequent hypotheses include the term (e.g., "on"), as well as particular adjacent content (e.g., "turn"), supplemental hypotheses can be generated based on a related term in order to provide additional hypotheses (e.g., "turn [down] . . . "), which can be considered when performing speech recognition. The method 400 can proceed from the operation 412, via continuation element "A," to an operation 414 of the method 420.

However, when, at operation 408, the term correspondence data is determined to identify the term or the other term, the method 400 can optionally proceed from the operation 408 to an optional operation 410. The operation 410 can include determining whether the term or the other term is positioned according to the term correspondence data. For instance, the term correspondence data can identify the term as being related to the other term when one or more adjacent terms are present. Therefore, when the one or more adjacent terms are present with the term in a particular speech recognition hypothesis, the inquiry at the operation 410 can be satisfied and the method 400 can proceed to the operation 414 via a continuation element "A." However, and optionally, when one or more adjacent terms are not present with the term in a particular speech recognition hypothesis, the inquiry at the operation 410 can be determined to not be satisfied, and as a result, the method 400 can proceed to the operation 416 via the continuation element "B."

The operation 414 can include generating one or more supplemental speech recognition hypotheses that include a related term. For example, a supplemental speech recognition hypothesis can include, "Assistant, turn down the lights in the living room." This supplemental speech recognition hypothesis can be generated based on the term correspondence data defining a relationship between the term "in" and the term "down." Alternatively, or additionally, this supplemental speech recognition hypothesis can be generated based on determining that the term "in" is adjacent to one or more other terms, which can be identified in position data of the term correspondence data. For example, the term correspondence data can define a relationship and/or condition such as: the term "in" is related to the term "down" when the term "in" is located in "N" speech recognition hypotheses directly adjacent to the term "turn," where N is any number.

The method 420 can proceed from the operation 414 to an operation 416, which can include determining a priority for each speech recognition hypothesis of the plurality of speech recognition hypotheses, as well as the one or more supplemental speech recognition hypotheses. The priority assigned to each speech recognition hypothesis can be based on a frequency of occurrence of a respective speech recognition hypothesis in historical data that is generated based on interactions between the user and the computing device, and/or a population of users and a variety of different computing devices. In some implementations, a priority assigned to each speech recognition hypothesis can be determined based on contextual data that is associated with a context of the user. For example, the contextual data can characterize content being rendered at one or more graphical user interfaces of one or more computing devices that are associated with the user. For instance, the user can be viewing a website that includes information about turning down lights to preserve energy, thereby resulting in a priority of a hypothesis with the term "down" being prioritized over a different hypothesis not having the term "down."

The method 420 can proceed from the operation 416 to an optional operation 418, which can include causing one or more applications and/or devices to initialize performance of one or more actions according to a prioritized speech recognition hypothesis. For example, the supplemental speech recognition hypothesis, "Assistant, turn down the lights in the living room," can be selected as the most prioritized speech recognition hypothesis. Based on this selection, an automated assistant that is accessible via that computing device can be responsive to the content of the selected hypothesis. Specifically, the automated assistant can initialize an application for controlling one more lights within a living room of a home of the user in accordance with the selected speech recognition hypothesis. In this way, despite the speech recognition process not initially generating a hypothesis that matches the original natural language content of the spoken utterance, an action specifically requested by the user was nonetheless performed without requiring a user to reiterate their spoken utterance and causing the computing device to, again, process another spoken utterance.

Figure 5:
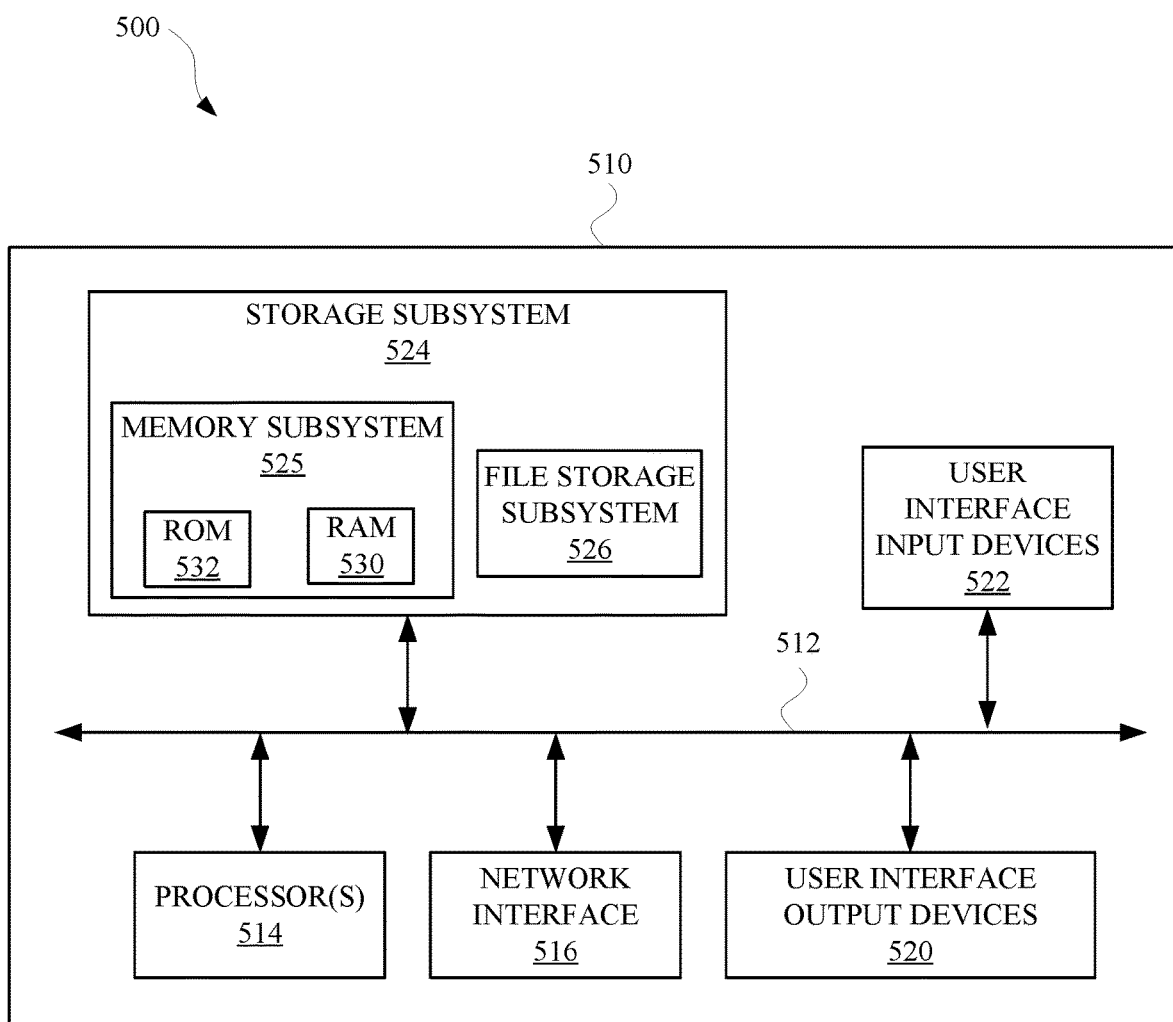
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the engines described herein. For example, the storage subsystem 524 may include the logic to perform selected aspects of method 400, and/or to implement one or more of computing device 104, computing device 204, system 300, automated assistant 304, input processing engine 306, and/or any other application, device, apparatus, and/or engine discussed herein.

These software engines are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The engines implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as processing, at a computing device, audio data corresponding to a spoken utterance provided by a user. The method can further include an operation of generating, based on processing the audio data, a plurality of speech recognition hypotheses, wherein each speech recognition hypothesis of the plurality of speech recognition hypotheses includes corresponding natural language content predicted to characterize original natural language content of the spoken utterance from the user. The method can further include an operation of determining, based on processing the audio data, whether a first term, of a first speech recognition hypothesis of the plurality of speech recognition hypotheses, is different from a second term, of a second speech recognition hypothesis of the plurality of speech recognition hypotheses. The method can further include, when the first term of the first speech recognition hypothesis is different from the second term of the second speech recognition hypothesis: generating, based on determining that the first term is different from the second term, term correspondence data that characterizes a relationship between the first term and the second term; and subsequent to generating the term correspondence data: processing the term correspondence data in furtherance of supplementing subsequent speech recognition hypotheses that identify the first term, but not the second term, and generating a supplemental speech recognition hypothesis for the subsequent speech recognition hypotheses, wherein the supplemental speech recognition hypothesis includes the second term.

In some implementations, the method can further include an operation of determining whether the first term and the second term are each predicted based at least in part on a same segment of the audio data, wherein generating the term correspondence data is performed when the first term and the second term are each predicted based at least in part on the same segment of audio data. In some implementations, the method can further include an operation of determining whether the first term of the first speech recognition hypothesis shares a common position with the second term of the second speech recognition hypothesis, wherein generating the term correspondence data is performed when the first term of the first speech recognition hypothesis shares the common position with the second term of the second speech recognition hypothesis.

In some implementations, determining whether the first term of the first speech recognition hypothesis shares the common position with the second term of the second speech recognition hypothesis includes: determining that the first term is directly adjacent to a particular natural language term within the first speech recognition hypothesis of the plurality of speech recognition hypotheses, and determining that the second term is also directly adjacent to the particular natural language term within the second speech recognition hypothesis of the plurality of speech recognition hypotheses. In some implementations, determining whether the first term of the first speech recognition hypothesis shares the common position with the second term of the second speech recognition hypothesis includes: determining that the first term is directly between two natural language terms within the first speech recognition hypothesis of the plurality of speech recognition hypotheses, and determining that the second term is also directly between the two natural language terms within the second speech recognition hypothesis of the plurality of speech recognition hypotheses. In some implementations, the method can further include an operation of determining, subsequent to generating the term correspondence data, a prioritized speech recognition hypothesis from the plurality of speech recognition hypotheses based on contextual data that characterizes a context in which the user provided the spoken utterance; and causing the computing device to render an output based on the prioritized speech recognition hypothesis.

In some implementations, the contextual data characterizes graphical content being rendered at a graphical user interface of the computing device when the user provided the spoken utterance. In some implementations, the contextual data further characterizes one or more applications that are accessible via the computing device, and determining the prioritized speech recognition hypothesis includes: prioritizing each speech recognition hypothesis of the plurality of speech recognition hypotheses according to whether each speech recognition hypothesis corresponds to an action that is capable of being initialized via the one or more applications that are accessible via the computing device. In some implementations, the first term includes one or more phonemes that correspond to one or more words in the first speech recognition hypothesis of the plurality of speech recognition hypotheses. In some implementations, the second term includes one or more other phonemes that correspond to one or more other words in the second speech recognition hypothesis of the plurality of speech recognition hypotheses.

In some implementations, the spoken utterance from the user is provided in furtherance of causing an application of the computing device to initialize performance of one or more actions. In some implementations, the method can further include an operation of, when the first term of the first speech recognition hypothesis is not different from the second term of the second speech recognition hypothesis: determining, based on existing term correspondence data, whether the first term and/or the second term are correlated with a related term in the existing term correspondence data. In some implementations, the method can further include an operation of, when the first term of the first speech recognition hypothesis is not different from the second term of the second speech recognition hypothesis, and when the first term and/or the second term are correlated with the related term in the existing term correspondence data: generating, based on the existing term correspondence data, another supplemental speech recognition hypothesis that includes the related term. In some implementations, the other supplemental speech recognition hypothesis is void of the first term and the second term.

In other implementations, a method implemented by one or more processors is set forth as including operations such as processing, at a computing device, audio data corresponding to a spoken utterance provided by a user. The method can further include an operation of generating, based on processing the audio data, a plurality of speech recognition hypotheses, wherein each speech recognition hypothesis of the plurality of speech recognition hypotheses includes corresponding natural language content predicted to correspond to original natural language content of the spoken utterance from the user. The method can further include an operation of identifying, based on at least processing the audio data, term correspondence data that characterizes a relationship between terms provided in previous speech recognition hypotheses generated based on one or more previous spoken utterances from the user. The method can further include an operation of determining, based on the term correspondence data, whether a candidate term, identified by the term correspondence data, is provided in the plurality of speech recognition hypotheses. The method can further include an operation of determining, based on the term correspondence data, whether a related term, identified by the term correspondence data as corresponding to the candidate term, is provided in the plurality of speech recognition hypotheses. The method can further include an operation of, when the candidate term is identified in the plurality of speech recognition hypotheses and the related term is not identified in the speech recognition hypotheses: generating a supplemental speech recognition hypothesis, wherein the supplemental speech recognition hypothesis includes the related term.

In some implementations, determining whether the candidate term is provided in the plurality of speech recognition hypotheses includes: determining that the candidate term is directly between two natural language terms within a first speech recognition hypothesis of the plurality of speech recognition hypotheses, and wherein determining whether the related term is provided in the plurality of speech recognition hypotheses includes: determining that the related term is also directly between the two natural language terms within a second speech recognition hypothesis of the plurality of speech recognition hypotheses, wherein the first speech recognition hypothesis is different from the second speech recognition hypothesis. In some implementations, determining whether the candidate term is provided in the plurality of speech recognition hypotheses includes: determining that the candidate term is directly adjacent to a particular natural language term within a first speech recognition hypothesis of the plurality of speech recognition hypotheses, and wherein determining whether the related term is provided in the plurality of speech recognition hypotheses includes: determining that the related term is also directly adjacent to the particular natural language term within a second speech recognition hypothesis of the plurality of speech recognition hypotheses, wherein the first speech recognition hypothesis is different from the second speech recognition hypothesis.

In some implementations, the method can further include an operation of determining a prioritized speech recognition hypothesis from the plurality of speech recognition hypotheses and the supplemental speech recognition hypothesis, wherein the prioritized speech recognition hypothesis is determined at least partially based on contextual data that characterizes a context in which the user provided the spoken utterance, and causing the computing device to render an output based on the prioritized speech recognition hypothesis. In some implementations, the contextual data characterizes graphical content being rendered at a graphical user interface of the computing device when the user provided the spoken utterance. In some implementations, the contextual data further characterizes one or more applications that are accessible via the computing device, and determining the prioritized speech recognition hypothesis includes: prioritizing each speech recognition hypothesis, of the plurality of speech recognition hypotheses and the supplemental speech recognition hypothesis, according to whether each speech recognition hypothesis corresponds to an action that is capable of being initialized via the one or more applications that are accessible via the computing device.

In some implementations, the candidate term includes one or more phonemes that correspond to one or more words in the plurality of speech recognition hypotheses. In some implementations, the related term includes one or more other phonemes that correspond to one or more other words in the plurality of speech recognition hypotheses.

In yet other implementations, a method implemented by one or more processors is set forth as including operations such as accessing, at a computing device, data characterizing multiple different speech recognition hypotheses that are generated in response to a spoken utterance provided by a user. The method can further include an operation of determining, based on accessing the data, that one or more first terms are provided in a first set of speech recognition hypotheses that is a subset of the speech recognition hypotheses. The method can further include an operation of determining, based on accessing the data, that one or more second terms are provided in a second set of speech recognition hypotheses that is another subset of the speech recognition hypotheses, wherein the one or more first terms are different from the one or more second terms, and wherein the first set of speech recognition hypotheses and the second set of speech recognition hypotheses share one or more common terms that are different from the one or more first terms and the one or more second terms. In some implementations, the method can further include an operation of generating, based on the one or more first terms being different from the one or more second terms, term correspondence data that characterizes a relationship between the one or more first terms and the one or more second terms. In some implementations, the method can further include an operation of, subsequent to generating the term correspondence data: determining that a third set of speech recognition hypotheses, which is not a subset of the speech recognition hypotheses, includes the one or more first terms, and generating, based on the term correspondence data characterizing the relationship between the one or more first terms and the one or more second terms, one or more supplemental speech recognition hypotheses that include the one or more second terms.

In some implementations, the one or more first terms are one or more phonemes, and the one or more second terms are one or more other phonemes. In some implementations, the method can further include an operation of, subsequent to generating the term correspondence data: determining that the third set of speech recognition hypotheses is void of the one or more second terms.

We claim:

1. A method implemented by one or more processors, the method comprising:
processing, at a computing device, audio data corresponding to a spoken utterance provided by a user;
generating, based on processing the audio data, a plurality of speech recognition hypotheses,
    wherein each speech recognition hypothesis of the plurality of speech recognition hypotheses includes corresponding natural language content predicted to characterize original natural language content of the spoken utterance from the user;
determining, based on processing the audio data, whether a first term, of a first speech recognition hypothesis of the plurality of speech recognition hypotheses, is different from a second term, of a second speech recognition hypothesis of the plurality of speech recognition hypotheses; and
when the first term of the first speech recognition hypothesis is different from the second term of the second speech recognition hypothesis:
    generating, based on determining that the first term is different from the second term, term correspondence data that characterizes a relationship between the first term and the second term;
    subsequent to generating the term correspondence data:
        processing the term correspondence data in furtherance of supplementing subsequent speech recognition hypotheses that identify the first term, but not the second term,
        generating a supplemental speech recognition hypothesis for the subsequent speech recognition hypotheses, wherein the supplemental speech recognition hypothesis includes the second term,
        determining a prioritized speech recognition hypothesis for the spoken utterance from the plurality of speech recognition hypotheses and the supplemental speech recognition hypothesis, and
        causing one or more applications and/or devices to initialize performance of one or more actions according to the prioritized speech recognition hypothesis;
processing, at the computing device, additional audio data corresponding to an additional spoken utterance provided by the user;
generating, based on processing the additional audio data, an additional plurality of speech recognition hypotheses,
determining, based on processing the additional audio data, whether an additional first term, of an additional first speech recognition hypothesis of the additional plurality of speech recognition hypotheses, is different from an additional second term, of an additional second speech recognition hypothesis of the additional plurality of additional speech recognition hypotheses; and
when the additional first term of the additional first speech recognition hypothesis is not different from the additional second term of the additional second speech recognition hypothesis:
    determining, based on existing term correspondence data, whether the additional first term and/or the additional second term are with a related term in the existing term correspondence data.

2. The method of claim 1, further comprising:
determining whether the first term and the second term are each predicted based at least in part on a same segment of the audio data,
    wherein generating the term correspondence data is performed when the first term and the second term are each predicted based at least in part on the same segment of audio data.

3. The method of claim 1, further comprising:
determining whether the first term of the first speech recognition hypothesis shares a common position with the second term of the second speech recognition hypothesis,
    wherein generating the term correspondence data is performed when the first term of the first speech recognition hypothesis shares the common position with the second term of the second speech recognition hypothesis.

4. The method of claim 3, wherein determining whether the first term of the first speech recognition hypothesis shares the common position with the second term of the second speech recognition hypothesis includes:
determining that the first term is directly adjacent to a particular natural language term within the first speech recognition hypothesis of the plurality of speech recognition hypotheses, and
determining that the second term is also directly adjacent to the particular natural language term within the second speech recognition hypothesis of the plurality of speech recognition hypotheses.

5. The method of claim 3, wherein determining whether the first term of the first speech recognition hypothesis shares the common position with the second term of the second speech recognition hypothesis includes:

determining that the first term is directly between two natural language terms within the first speech recognition hypothesis of the plurality of speech recognition hypotheses, and determining that the second term is also directly between the two natural language terms within the second speech recognition hypothesis of the plurality of speech recognition hypotheses.

6. The method of claim 1, further comprising:

determining, subsequent to generating the term correspondence data, a prioritized speech recognition hypothesis from the plurality of speech recognition hypotheses based on contextual data that characterizes a context in which the user provided the spoken utterance; and causing the computing device to render an output based on the prioritized speech recognition hypothesis.

7. The method of claim 6, wherein the contextual data characterizes graphical content being rendered at a graphical user interface of the computing device when the user provided the spoken utterance.

8. The method of claim 6, wherein the contextual data further characterizes one or more applications that are accessible via the computing device, and determining the prioritized speech recognition hypothesis includes:

prioritizing each speech recognition hypothesis of the plurality of speech recognition hypotheses according to whether each speech recognition hypothesis corresponds to an action that is capable of being initialized via the one or more applications that are accessible via the computing device.

9. The method of claim 1, further comprising:

when the first term of the first speech recognition hypothesis is not different from the second term of the second speech recognition hypothesis, and when the first term and/or the second term are correlated with the related term in the existing term correspondence data:

generating, based on the existing term correspondence data, another supplemental speech recognition hypothesis that includes the related term.

10. The method of claim 9, wherein the other supplemental speech recognition hypothesis is void of the first term and the second term.

* * * * *